United States Patent [19]
Griffiths et al.

[11] 3,820,559
[45] June 28, 1974

[54] HOSE REEL

[75] Inventors: Roger O. Griffiths; Ronald E. Albrecht, both of Minneapolis, Minn.

[73] Assignee: Graco Inc., Minneapolis, Minn.

[22] Filed: June 22, 1973

[21] Appl. No.: 372,888

[52] U.S. Cl............................ 137/355.16, 137/355.26
[51] Int. Cl............................................. B65h 75/46
[58] Field of Search.................... 137/355.12–355.28

[56] References Cited
UNITED STATES PATENTS
2,010,811    8/1935    Craig................................ 137/355.26

*Primary Examiner*—Henry T. Klinksiek
*Attorney, Agent, or Firm*—Paul L. Sjoquist

[57] ABSTRACT

A hose reel is disclosed having a pair of plastic, flexible, dish-shaped hubs with mating circumferential surfaces spaced apart less than the diameter of the hose, and having an enclosed inner chamber for storing a length of such hose, and a hose connector protruding through the side of one of the hubs at an inner diameter and connectable to the interior hose end.

7 Claims, 3 Drawing Figures

PATENTED JUN 28 1974 3,820,559

HOSE REEL

This invention relates to an apparatus for storing and carrying hoses. It is particularly adaptable for the storing of hoses of the type used in conjunction with paint spraying systems, where such systems are portably mounted on the bed of trucks or other vehicles. However, it is useful for storing any of a large variety of hoses of lengths up to 500 feet. The invention is sturdy enough to accommodate bulky, semi-stiff hoses yet flexible enough to use with hoses of varying diameters.

A principal problem with prior art hose reels is that of preventing the unwinding of hoses stored thereon when not in use. This problem has been solved in the past by utilizing various supplementary clamping devices in conjunction with the hose reel, frequently kinking or clamping the hose and potentially causing hose damage. Another problem which has been present in the prior art, particularly when long lengths of relatively heavy hose are stored, is that the hose reel of necessity has been made very bulky and heavy in order to withstand the stresses of handling such hoses. The extra weight of such hose reels has presented an unnecessary burden in transporting portable systems utilizing them; because the hose reel is an auxiliary device in portable paint spraying systems it is desirable to minimize its weight and bulk in order to allow room for more essential equipment and supplies necessary to the paint-spraying business.

Further, it has been a desirable feature in hose reels of this type to provide a means for connecting the ends of the hose to appropriate fluid transfer equipment even though the hose may only be partially unwound from the hose reel. Thus, access to the internal end of the hose on the reel must be provided, preferably in a manner which enables a quick and easy connection.

It is therefore a principal object of this invention to provide a hose reel of light construction which can store at least several hundred feet of hose in a manner to prevent the unwinding of such hose when not in use.

It is another object of this invention to provide a convenient means for unwinding hose stored on the hose reel to any intermediate lengths, and to provide an external coupling means for connecting fluid transfer equipment conveniently to both ends of such hose.

These and other objects are accomplished in the present invention by a flexible plastic hose reel having a deformable lip around its outer periphery for enclosing portions of said hose within the reel. The invention utilizes a principle similar to that found in devices used in another art, commonly known as "fish tapes," wherein lengths of spring steel are unwound from a reel for the purpose of feeding through pipes and electrical conduits. The present invention also utilizes a hose coupling for connection to the internal hose end, which coupling protrudes outwardly through the side of the hose reel for connection to a fluid transfer apparatus.

The objects and purposes of this invention can best be understood by reference to the accompanying specification and drawings, in which.

Briefly, the invention comprises a pair of flexible plastic dish-shaped hubs having mating lips around their circumference, and an internal chamber for storing hose. The circumferential lips are mated to form an enclosed cylinder, but are deformable to allow the enclosed hose to be withdrawn as the assembly is rotated. The invention also comprises a hose coupling placed along an inner radius for connection to the internal hose end and protruding through the external hub for connection to a fluid transfer source.

Figure 1:
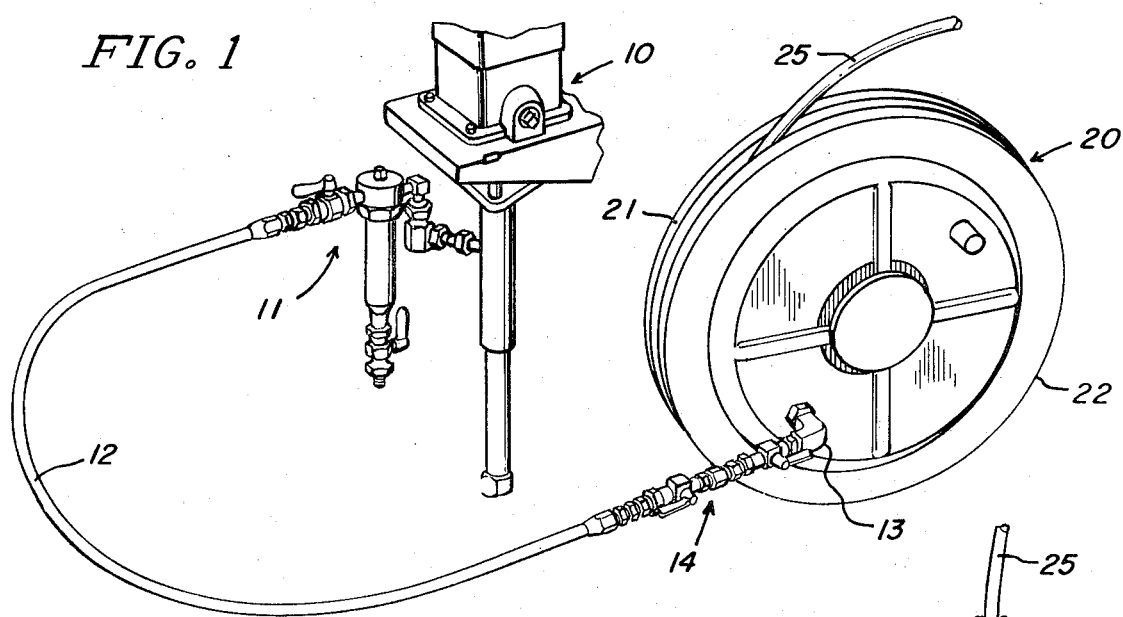
FIG. 1 illustrates the invention in perspective view connected to a fluid transfer source.

FIG. 1 illustrates the invention in perspective view connected to a fluid transfer pump 10 via appropriate coupling and valving apparatus 11. A short external hose length 12 is connected to hose reel connector 13 via hose couplings 14, which may be of a quick-disconnect type. Hose reel connector 13 is mounted at an inner radius of hose reel 20, and protrudes through the inside of the hose reel to connect to the inner end of hose 25. Hose reel 20 is comprised of an inner hub 21 and an outer hub 22, each constructed from a flexible plastic material and attached together in a manner hereinafter to be described. A handle 19 is provided for allowing manual rotation of hose reel 20 upon its axis.

Figure 2:
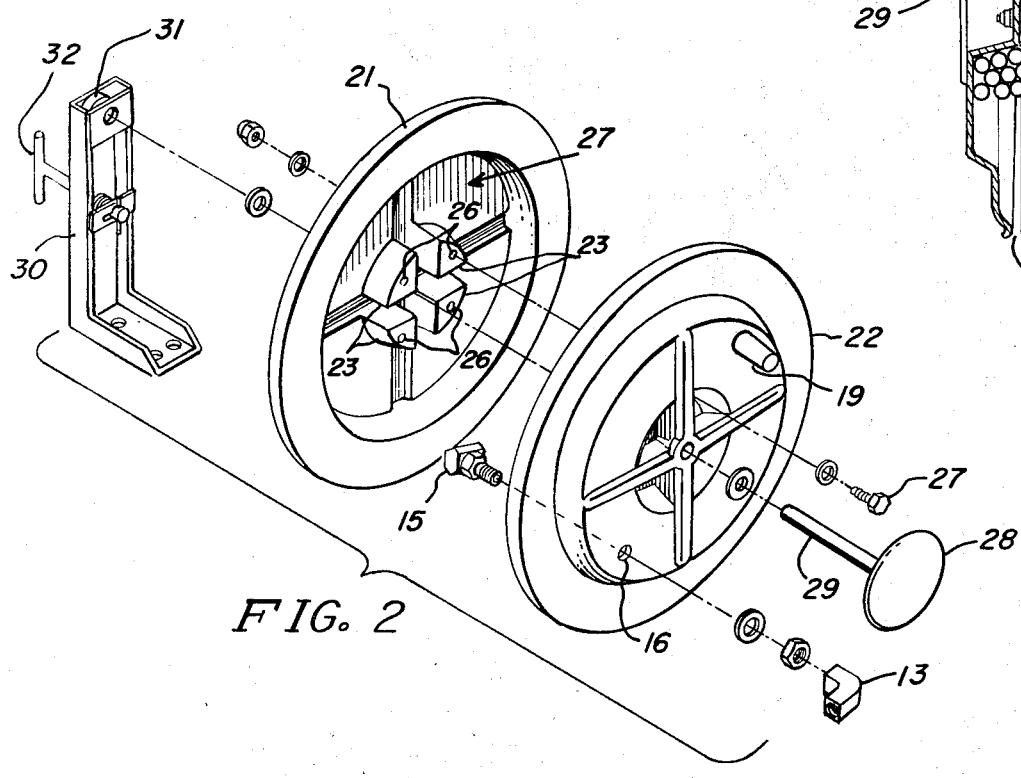
FIG. 2 is an exploded perspective view of the various inventive components.

FIG. 2 illustrates, in exploded perspective view, the components of hose reel 20. Hub 21 has four internal raised shoulders 23, each having spaced notches therebetween. Each shoulder 23 has a hole 26 through which a locking bolt may be passed. The internal section of hub 22 has an X-shaped protruding shoulder section, designed to fit within the spaced notches formed between shoulders 23. In this manner, when hubs 21 and 22 are placed together an interlocking arrangement is created to cause both hubs to rotate together. The hubs are held in a facing relationship by means of bolts 27, one of which passes through each of the hubs and a hole 26. For convenience only, single bolt 27 is illustrated in FIG. 2, it being assumed that three additional bolts 27 are also used.

Hose reel connector 13 is coupled to an internal connector 15 which passes through the hole 16 at an internal radius of hub 22. Internal connector 15 is adapted for connection to the internal hose end of hose 25.

The dish-shaped construction of hub 21 forms one-half of an internal chamber 27 for storing the accumulating hose length. The other half of chamber 27 is formed by similarly-shaped hub 22. Internal chamber 27 can best be viewed in FIG. 3, which is a cross-sectional end view of the invention.

The hose reel is mounted on a shaft 29 which passes through a center hole in both hubs 21 and 22 and through an appropriate mounting hole in mounting bracket 30. A bearing 31 may be used in conjunction with mounting bracket 30 to facilitate rotation of the entire assembly, and appropriate washers and other attaching means are used for connecting to mounting bracket 30. Also attached to the external end of shaft 29 is a hub cap 28. Alternatively, shaft 29 may be fixedly mounted to bracket 30 and hose reel 20 may be rotatably mounted to shaft 29.

A spring-loaded handle 32 is mounted through mounting bracket 30, and serves as a locking device to prevent rotation of hose reel 20. In order for the hose reel to be rotated, it is necessary to pull handle 32 away from engagement with the protruding ribs of hub 21, and then to rotate hose reel 20 by means of handle 19.

The hose reel may be unwound to any desired length of hose 25, and can be locked in that position by merely releasing handle 32 to once again come into engagement with the ribs of hub 21. Bracket 30 is typically bolted to the bed of a truck or other vehicle for rigidly clamping the entire assembly.

Figure 3:
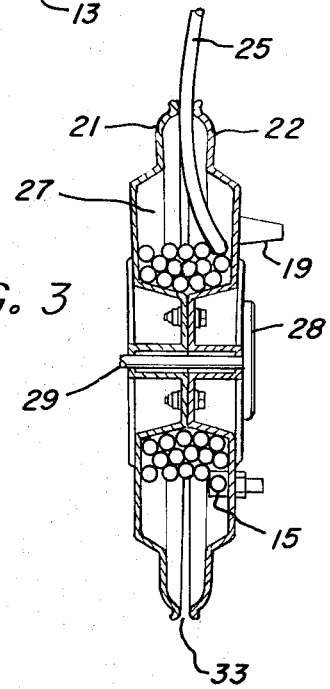
FIG. 3 is a cross-sectional view of the invention.

FIG. 3 illustrates the invention in cross-section, with a length of hose 25 attached at its internal end to internal connector 15. The figure illustrates a portion of hose 25 emerging from the mating surfaces between hub 21 and 22, and further illustrates the deformable nature of these mating surfaces. As hose 25 is pulled out from within hose reel 20, it causes the outer circumference of hubs 21 and 22 to separate enough to allow withdrawal of hose 25. The separation occurs only at the point of emergence of hose 25, the remaining circumference of hubs 21 and 22 maintains a tight circumferencial mating surface. It is neither necessary nor preferable that the outer circumferential surfaces of hubs 21 and 22 make actual contact with one another. It is sufficient that the gap between such surfaces be less than the diameter of the hose contained on the hose reel. For example, a hose of 1-inch outside diameter can adequately be stored and confined on a hose reel having a gap 33 of approximately ½ inch at the outer circumferential surfaces of the hubs.

FIG. 3 also illustrates the attachment of hub 21 to hub 22 via bolts 27. This attaching means, together with the interlocking center portion of the respective hubs, provides a rotatably rigid assembly for hose reel 20.

The apparatus of this invention can be scaled to an appropriate size to handle a wide variety of hoses. A typical working embodiment of the invention utilizes hubs of approximately three feet in diameter and is capable of storing up to 500 feet of ⅜-inch diameter paint hose or, alternatively, up to 200 feet of ½-inch diameter water hose. In a typical application, the length of hose desired for a particular job is first unrolled from the reel, and then the hose reel connector 13 is coupled to the fluid supply source. When the job is completed, the hose reel connector may be connected to a flushing system or may be air-purged, and the hose reel connector is then disconnected so that the hose may be rewound into the hose reel.

Although a preferred embodiment of the invention has been described herein, many variations to the various components of the invention may be made. For example, other means of forming the center interlocking portion of hubs 21 and 22 may be chosen for this purpose. Also, the precise shape of the respective hubs may be varied so long as the external circumference forms a mating surface and an internal chamber is created for storing hose.

What is claimed is:

1. Hose reel apparatus rotatably mounted on a shaft, comprising:

a pair of reel hubs each having a concave inner surface for creating a hose storage chamber when said hubs are clamped together, and each having a deformable outer circumferential lip in approximate mating positions for passing hose therebetween;

means for clamping said reel hubs together at a region surrounding said mounting shaft; and a hose connector mounted at an inner radius of one of said hubs, said hose connector having a hose connection means internal said hose storage chamber, and a second connection means external said hub.

2. Apparatus as claimed in claim 1, wherein said reel hubs are formed from plastic having a resiliency of at least a distance equal to a hose diameter at the outer circumferential lips.

3. Apparatus as claimed in claim 2, further comprising an outward handle projection at an inner radius of one of said reel hubs.

4. Apparatus as claimed in claim 3 wherein said means for clamping said reel hubs together further comprises internally raised shoulders on each of said hubs, said shoulders adapted for interlocking and having holes therethrough for attaching locking bolts.

5. A hose reel storage and winding apparatus comprising:

a mounting bracket for attaching said apparatus to a mounting surface, said mounting bracket having a shaft mounting support therein;

a shaft supported on said shaft mounting support and outwardly projecting;

a first reel hub rotatably mounted on said shaft, said first reel hub having a dish-shaped surface with a concave interior and having a deformable flange around its outer circumference;

a second reel hub rotatably mounted on said shaft, said second reel hub having a dish-shaped surface with a concave interior facing the first reel hub interior and having a deformable flange around its outer circumference;

means for clamping said first and second reel hubs together near their centers while leaving a space between the two outer circumference flanges; and hose connecting means for attaching to a hose internal said reel hubs, said means passing through said second hub at an internal radius distance.

6. Apparatus as claimed in claim 5 wherein said first and second reel hubs are constructed of plastic material.

7. Apparatus as claimed in claim 6 wherein said means for clamping said first and second reel hubs together is sized so as to leave a space between said hub outer flanges which is slightly less than a hose diameter in distance.

* * * * *